June 29, 1937.  E. A. ROCKWELL  2,085,607
POWER CLUTCH
Filed March 10, 1934  2 Sheets-Sheet 1

INVENTOR
Edward A. Rockwell
BY
ATTORNEY

June 29, 1937.  E. A. ROCKWELL  2,085,607
POWER CLUTCH
Filed March 10, 1934   2 Sheets-Sheet 2

INVENTOR
Edward A. Rockwell
BY
ATTORNEY

Patented June 29, 1937

2,085,607

UNITED STATES PATENT OFFICE 2,085,607

POWER CLUTCH

Edward A. Rockwell, Chicago, Ill., assignor, by mesne assignments, to General Auto Parts Corporation, a corporation of Delaware Application March 10, 1934, Serial No. 714,954

12 Claims. (Cl. 192—35)

This invention relates to improvements in clutches, and more particularly to those adapted for use in motor vehicles.

The purpose of the invention is to provide a clutch in which engagement is normally accomplished automatically by centrifugal means, while disengagement is accomplished by power means connected to the driven member. Control of the power means may be manual or may be accomplished by vacuum or other servo means, automatically if desired.

Fig. 3 is a detail view of the presser plate drive pin arrangement of the clutch, being a section taken on line 3—3 of Fig. 2.

Fig. 4 is a detail view of adjusting means for the rear presser plate of the clutch, being a section taken on line 4—4 of Fig. 2.

Fig. 5 is a view of the adjusting means for the forward presser plate of the clutch, being a section taken on line 5—5 of Fig. 2.

Figure 1:
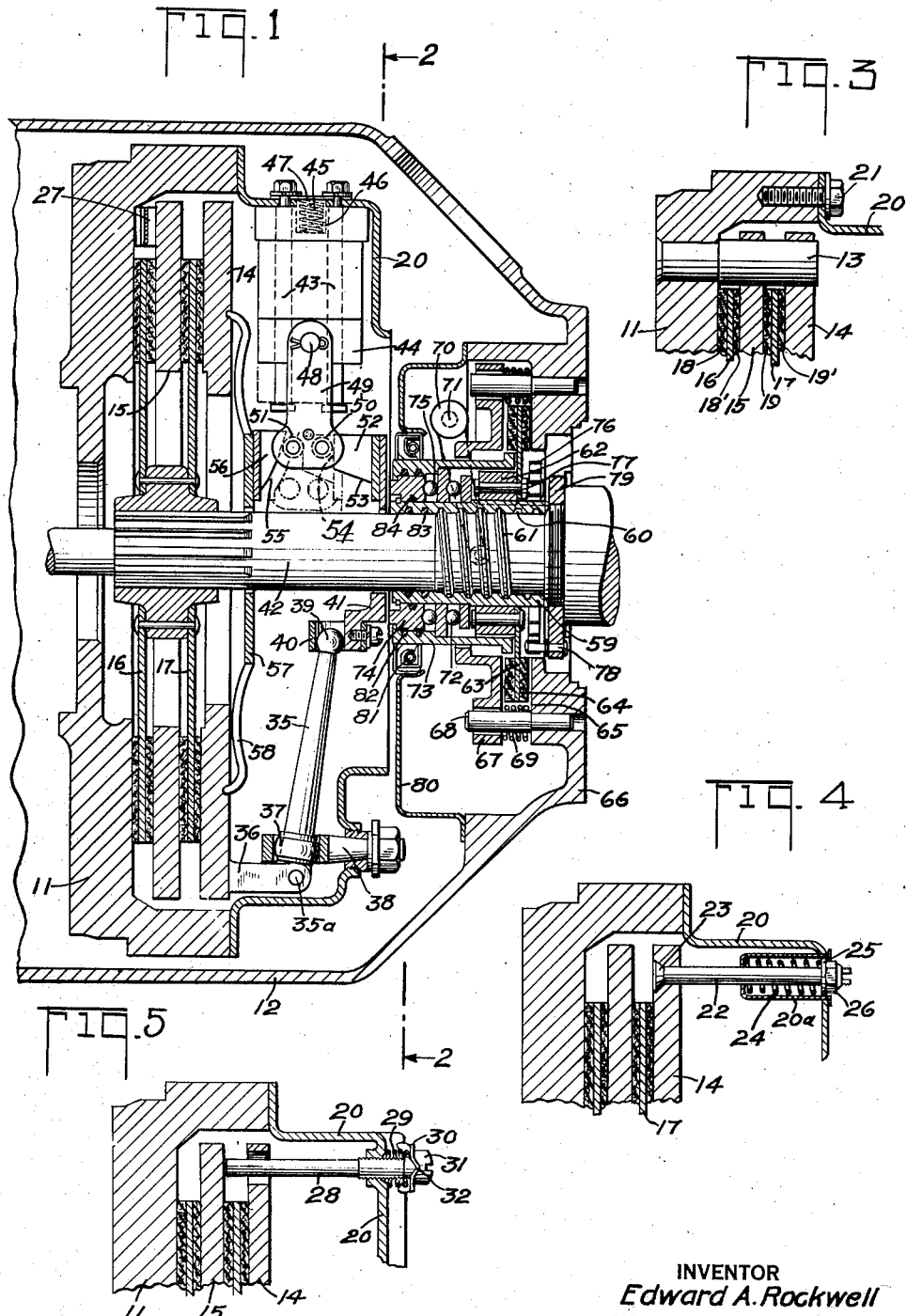
Fig. 1 is a vertical longitudinal section of a clutch embodying the invention.

Referring to Fig. 1, the numeral 11 denotes the flywheel enclosed in a stationary casing or bellhousing 12. A plurality of guide pins 13 (Fig. 3) fixed in the flywheel 11, support a presser plate 14 and an intermediate plate 15 slidable thereon.

Driven plates 16 and 17 of resilient construction are disposed respectively between flywheel 11 and intermediate plate 15 and between intermediate plate 15 and presser plate 14. The driven plates 16 and 17 have the usual friction facings 18, 18' and 19, 19' adapted to be engaged by the driving plates 14 and 15 and the flywheel 11.

A rear plate or cover 20 is fastened to the flywheel 11 by means of cap bolts 21.

A plurality of rods 22 (Fig. 4) have heads 23 countersunk in the front of rear presser plate 14. Cupped guides 20a retained in the cover plate 20, contain compression springs 24 bearing against washers 25 held under nuts 26 on rods 22. The action of springs 24 is to urge rods 22 to the right (Fig. 4) thereby urging rear presser plate 14 away from the face of flywheel 11, giving a clearance between presser plate 14 and the driven plate 17.

The intermediate plate 15 is also urged away from the face of flywheel 11 by flat springs 27 (Fig. 1), its outward movement being limited by stop pins 28 adjustably held in the cover plate 20, (Fig. 5) thereby maintaining the intermediate plate in a position of clearance with both driven plates 16 and 17 when the latter are in their released positions.

Springs 29 urge clips 30 against the bottom of slotted heads 31 of stop pins 28. Ridges 32 formed on clips 30 engage corresponding grooves in the bottom of heads 31. As pins 28 are screwed inward or outward the clips 30 are restrained from turning by lugs 33 bearing against shoulders 34 on the cover plate 20, so that the ridges 32 being forced out of and dropping into the corresponding grooves in heads 31 act as latches, giving a definite "notching" adjustment to the pins. By this means all pins may readily be adjusted alike to give a proper clearance position to the intermediate plate 15.

Figure 2:
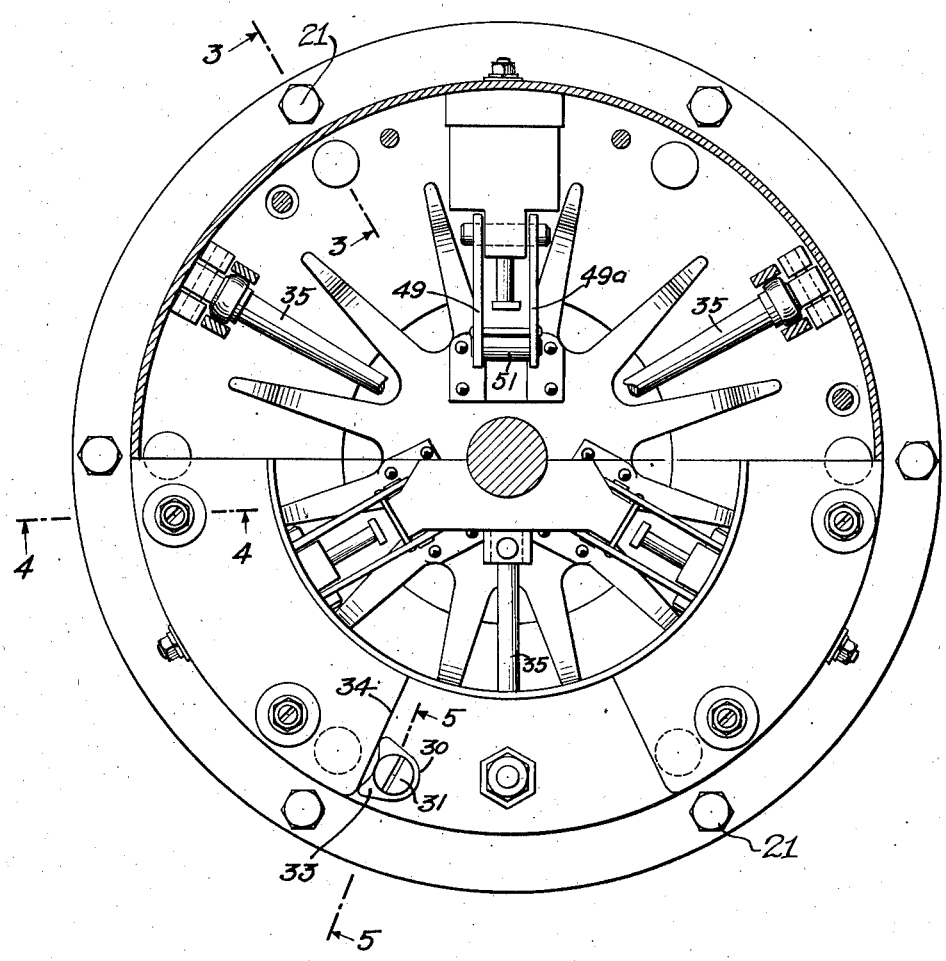
Fig. 2 is a rear view of the clutch (Fig. 1) in partial section on line 2—2 of Fig. 1.

A plurality of radially disposed levers 35 (Figs. 1 and 2) are pivoted at 35a to extensions 36 of the presser plate 14, and carry enlarged spherical rings 37 engaging the interior of eye-bolts 38 adjustably retained in the cover plate 20. The inner ends 39 of levers 35 are spherical in shape and engage loops 40 secured to a ring member 41 disposed around the driven shaft 42.

A plurality of rods 43, radially fixed in parallel pairs in the cover plate 20, act as guides for sliding centrifugal weights 44. Compression springs 45 in sockets 46 of weights 44 bear against plates 47 fastened to the cover 20 and urge the weights 44 inward. Each weight 44 supports a cross pin 48 on which are pivoted two links 49, 49a which in turn support two transverse parallel rollers 50 and 51.

The rear rollers 50 engage cams 52 fastened to ring 41, said cams having an inner inclined face 53 and a forward radial face 54. The front rollers 51 engage the inclined rear faces 55 of cams 56 fastened to a spring plate 57. Radial spring fingers 58 which may either be attached to plate 57 or formed integrally therewith, as shown, press against the back of presser plate 14.

When the engine is idling and the weights are in the position shown in dotted lines Fig. 1, the rollers 50 and 51 have released the cams 52 and 56, removing the pressure from finger springs 58 and levers 35, so that the presser plate 14 and intermediate plate 15 are held out of engagement with the driven members by their respective springs 24 and 27. As the motor speeds up the rollers 50 and 51 roll outward along the inclined faces 53 and 55 of the cams 52 and 56. This action forces the cams apart, putting pressure on finger springs 58 and swinging levers 35 about their fulcra in eye-bolts 38, so as to force the presser plate rapidly toward the flywheel 11. As the motor approaches engaging speed the rollers 50 overrun the inner inclined faces 53 of cams 52 and start out along the radial faces 54. The motion and force of the weights now acts only through the comparatively small angle of face 55, so that the rate of separation of the cams is decreased and the multiplication of power increased, giving a gradual but powerful movement to the levers 35 to bring the clutch surfaces into engagement.

Engagement having occurred, the weights 44 continue to move outward as the speed increases, thereby increasing the loading of finger springs 58 and the force applied through the levers 35 to the friction surfaces, until the weights are stopped by the cover plate 20, after which no further increased force can be applied to the said surfaces.

A sleeve 59 having an internal worm thread 60 is loosely screwed on a corresponding external worm thread 61 on the driven shaft 42. A ring 62, loosely splined on the sleeve 59, carries a plate 63 having annular friction facings 64. The facings 64 are disposed between a face 65 on the rear portion or member 66 of the bell-housing 12 and a brake presser plate 67 slidable on guide pins 68 fixed in the member 66. Springs 69 normally hold brake presser plate 67 out of engagement with friction members 64, and a yoke 70 on the cross shaft 71 is adapted to force the brake presser plate 67 to the right (Fig. 1) so as to cause braking engagement when 71 is rotated counter-clockwise.

The cross shaft 71 may be rotated by a foot pedal of any desired construction (not shown). It is not intended however, to limit the invention to manual operation of the braking mechanism, as any suitable type of servo, such as a hydraulic or vacuum operated device, may be used to rotate the cross shaft 71.

When the presser brake plate 67 is moved to the right the friction annulus 64 is gripped between the former and the face 65. The drag thus produced is communicated through the splined ring 62 and the sleeve 59 to the worm threads, which slip, screwing the sleeve 59 to the left. Through a ball thrust bearing 72 the sleeve 59 moves an outer sleeve 73 to the left causing an annular member 74 backed by a second ball thrust bearing 75 to engage the ring 41. Ring 41 is thus moved to the left against the pressure of finger springs 58, swinging levers 35 to the left and disengaging the clutch.

The numeral 76 denotes a spiral spring having one end pivoted at 77 to the ring 62 and plate 63, the other end being pivoted at 78 to a collar member 79 screwed on the shaft 42.

As the plate 63 is retarded, as previously noted, the spring 76 is coiled more tightly due to the relative motion between plate 63 and shaft 42. When the plate 63 is released the spring 76 uncoils, returning the plate to its original position relative to the shaft 42, thereby retracting the sleeve 59. The clutch is thereby allowed to reengage, provided the motor speed is sufficient to hold the weights outward. If, however, the motor speed has dropped sufficiently, to allow the weights to move inward, the pressure of rollers 50, 51 is relieved from the cams and finger springs 58, and the clutch remains disengaged.

To insure long life and smooth action it is desirable that the braking parts be operated in oil. An interior casing 80 and seals 81, 82, 83 and 84, Fig. 1, allow operation of the disengaging power unit in oil without the passage of lubricant into the clutching mechanism.

What is claimed is:

1. In a clutch, in combination, a housing, a driving member including a movable pressure plate, a driven member, a spider comprising a plurality of finger springs engaging said pressure plate, a plurality of radially inclined cams on said spider, a plurality of levers pivotally attached to said pressure plate at their outer ends and fulcrumed in said driving member, a ring engaging the inner ends of said levers, a plurality of radially inclined cams on said ring, a plurality of links supporting rollers engaging said first mentioned cams and other rollers engaging said second mentioned cams, weights attached to said links and slidable radially in said driving member, and springs adapted to oppose outward movement of said weights.

2. In a clutch, in combination, a housing, a driving member including a movable pressure plate, a driven member, a spider comprising a plurality of finger springs engaging said pressure plate, a plurality of radially inclined cams on said spider, a plurality of levers pivotally attached to said pressure plate at their outer ends and fulcrumed in said driving member, a ring engaging the inner ends of said levers, a plurality of radially inclined cams on said ring, a plurality of links supporting rollers engaging said first mentioned cams and other rollers engaging said second mentioned cams, weights attached to said links and slidable radially in said driving member, springs adapted to oppose outward movement of said weights, and power means on said driven member adapted to force said ring toward said pressure plate.

3. In a clutch, in combination, a housing, a driving member including a movable pressure plate, a driven member, a spider comprising a plurality of finger springs engaging said pressure plate, a plurality of radially inclined cams on said spider, a plurality of levers pivotally attached to said pressure plate at their outer ends and fulcrumed in said driving member, a ring engaging the inner ends of said levers, a plurality of radially inclined cams on said ring, a plurality of links supporting rollers engaging said first mentioned cams and other rollers engaging said second mentioned cams, weights attached to said links and slidable radially in said driving member, springs adapted to oppose outward movement of said weights, the inclined faces of said first mentioned cams extending radially outward beyond the inclined faces of said second mentioned cams.

4. In a clutch comprising driving and driven members, a driven shaft, a plurality of levers on said driving member, means adapted to actuate said levers to cause engagement of said driving and driven members, a cylindrical member on said driven shaft adapted to engage said levers, and power means, having an oil submerging enclosure, to cause longitudinal displacement of said cylindrical member through said enclosure whereby said levers may be actuated to disengage said driving and driven members.

5. In a clutch comprising driving and driven members, a driven shaft, a plurality of levers on said driving member, means adapted to actuate said levers to cause engagement of said driving and driven members, a cylindrical member on said driven shaft adapted to engage said levers, and power means, having an oil submerging enclosure, to cause longitudinal displacement of said cylindrical member through said enclosure whereby said levers may be actuated to disengage said driving and driven members, said power means including cooperative rotatable and stationary friction members and means to cause engagement thereof.

6. In a clutch, in combination, a casing, a driven shaft, a worm in a fixed position on said shaft, a sleeve engaging said worm adapted to disengage said clutch, a brake disk slidably splined to said sleeve, friction members having a keyed connection on said casing, and means to cause engagement of said friction members with said brake disk.

7. In a clutch, in combination, a driving member, a driven member, a plurality of centrifugal weights adapted to provide force for engaging said members, and means including a cam with changing inclinations to transmit said force in an axial direction from said weights to said members at different initial and final rates of speed relative to the centrifugal motion of said weights, said initial rate being higher than said final rate.

8. In a clutch, in combination, a casing, a driven shaft, a worm on said shaft, a sleeve engaging said worm adapted to disengage said clutch, a brake disk slidably splined to said sleeve, friction members attached to said casing, means to cause engagement of said friction members with said brake disk whereby said brake disk is retarded relative to said shaft, and a torsion spring attached to said disk and said shaft.

9. In a clutch, in combination, a driven shaft, a worm on said shaft, a worm sleeve on said worm, a brake disk on said worm sleeve free during clutch engagement, means to retard said disk relative to said shaft, and means mounted on the driven shaft adapted to apply a force tangentially to accelerate said disk relative to said shaft.

10. In a clutch, in combination, a driven shaft, a worm on said shaft, a worm sleeve on said worm, a brake disk on said worm sleeve free during clutch engagement, friction means to retard said disk relative to said shaft, and spring means mounted on the driven shaft adapted to apply a force tangentially to accelerate said disk relative to said shaft.

11. In a clutch, in combination, a driven shaft, a worm on said shaft, a worm sleeve on said worm, a brake disk on said worm sleeve free during clutch engagement, means to retard said disk relative to said shaft, and a torsion spring mounted on the driven shaft adapted to apply a force tangentially to accelerate said disk relative to said shaft.

12. In combination, a casing, a clutch in said casing, a second casing within said main casing, a power unit in said second casing adapted to disengage said clutch, and means to prevent passage of lubricant from said second casing to said clutch.

EDWARD A. ROCKWELL.